(12) United States Patent
Tazik et al.

(10) Patent No.: US 11,982,568 B2
(45) Date of Patent: *May 14, 2024

(54) **SYSTEMS AND METHODS FOR *IN SITU* OPTIMIZATION OF TUNABLE LIGHT EMITTING DIODE SOURCES**

(71) Applicant: CHEMIMAGE CORPORATION, Pittsburgh, PA (US)

(72) Inventors: Shawna Tazik, Pittsburgh, PA (US); Alyssa Zrimsek, Pittsburgh, PA (US); Heather Gomer, Sewickley, PA (US); Jihang Wang, Sewickley, PA (US); Patrick J. Treado, Pittsburgh, PA (US)

(73) Assignee: CHEMIMAGE CORPORATION, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,186

(22) Filed: Apr. 18, 2022

(65) Prior Publication Data

US 2023/0035060 A1 Feb. 2, 2023

Related U.S. Application Data

(63) Continuation of application No. 17/112,393, filed on Dec. 4, 2020, now Pat. No. 11,307,095.

(Continued)

(51) Int. Cl.
*G01J 3/28* (2006.01)
*G01J 3/10* (2006.01)

(52) U.S. Cl.
CPC ............... *G01J 3/2823* (2013.01); *G01J 3/10* (2013.01); *G01J 2003/283* (2013.01)

(58) Field of Classification Search
CPC .... G01J 2003/2869; G01J 3/10; G01J 3/2823; G01J 2003/106; G02B 19/0061
See application file for complete search history.

(56) References Cited

U.S. PATENT DOCUMENTS 5,289,374 A * 2/1994 Doi .................. G16H 50/20
382/256
2006/0247514 A1 11/2006 Panasyuk et al.
(Continued)

FOREIGN PATENT DOCUMENTS

CN 110072316 B 12/2020
CN 112565621 A 3/2021

OTHER PUBLICATIONS

Levenberg, "A Method for the Solution of Certain Non-Linear Problems in Least Squares," 1944, Quarterly of Applied Mathematics 2(2):164-168.

(Continued)

*Primary Examiner* — Maurice C Smith
(74) *Attorney, Agent, or Firm* — DLA Piper LLP (US)

(57) ABSTRACT

Systems for and methods for in situ optimization of tunable light emitting diode sources are disclosed herein. During operation, the systems and methods obtain real-time feedback from an image sensor, and that feedback is used to tune the tunable LEDs. By tuning the tunable LEDs, the best values for the LED spectral output can be selected based on the feedback from the image sensor, and an image with improved contrast is obtained. Alternatively, the amount of time to obtain an image with acceptable contrast is reduced.

13 Claims, 3 Drawing Sheets

Related U.S. Application Data

(60) Provisional application No. 62/943,316, filed on Dec. 4, 2019.

(56) References Cited

U.S. PATENT DOCUMENTS

2014/0198315 A1   7/2014   Priore et al.
2018/0107015 A1   4/2018   Dumpelmann et al.

OTHER PUBLICATIONS

Marquardt, "An Algorithm for Least-Squares Estimation of Nonlinear Parameters," 1963, Journal of the Society for Industrial and Applied Mathematics, 11(2):431-441.
Dennis, Jr., "Numerical Methods for Unconstrained Optimization and Nonlinear Equations," 1966, Classics in Applied Mathematics, vol. 16.

* cited by examiner

SYSTEMS AND METHODS FOR *IN SITU* OPTIMIZATION OF TUNABLE LIGHT EMITTING DIODE SOURCES

CROSS-REFERENCE TO RELATED APPLICATIONS

This application claims priority to U.S. Provisional Application Ser. No. 62/943,316 filed Dec. 4, 2019, the content of which is hereby incorporated by reference in its entirety.

BACKGROUND

Spectroscopic imaging combines digital imaging and optical spectroscopy techniques, which can include Raman scattering, fluorescence, photoluminescence, laser induced breakdown, ultraviolet, visible and infrared absorption spectroscopies. When applied to the chemical analysis of materials, spectroscopic imaging is also referred to as chemical imaging. Instruments for performing spectroscopic (i.e. chemical) imaging typically comprise an illumination source, image gathering optics, focal plane array imaging detectors and imaging spectrometers.

Spectroscopic imaging of a sample is commonly implemented by one of two methods. First, point-source illumination can be used on a sample to measure the spectra at each point of the illuminated area. Second, spectra can be collected over the entire area encompassing a sample simultaneously using an electronically tunable optical imaging filter such as an acousto-optic tunable filter (AOTF), a multi-conjugate tunable filter (MCF), or a liquid crystal tunable filter (LCTF). Here, the organic material in such optical filters is actively aligned by applied voltages to produce the desired bandpass and transmission function. The spectra obtained for each pixel of an image forms a complex data set referred to as a hyperspectral image. Hyperspectral images may contain the intensity values at numerous wavelengths or the wavelength dependence of each pixel element in the image. Multivariate routines, such as chemometric techniques, may be used to convert spectra to classifications.

Conformal filters have been utilized to provide in situ optimization to find the optimal discrimination between of target and background materials. However, there exists a need for systems and methods that can perform in situ optimization of tunable light emitting diode (LED) sources driven by real-time feedback produced by an image sensor of a live scene.

SUMMARY

One aspect of the disclosure relates to a method comprising receiving at least a first data set from an image sensor. The first data set is collected by the image sensor based on illumination of a sample using a tunable light emitting diode source having a plurality of tuning states corresponding to a plurality of illumination spectrums. The first data set is associated with a first tuning state associated with a first illumination spectrum. A score image data set is generated based on the first data set. Whether the score image data set satisfies a tolerance level is determined. A set of test data is generated based on the score image data set when the score image data set satisfies the tolerance level.

Another aspect of the disclosure relates to a method comprising illuminating a sample, using a tunable light emitting diode source having a plurality of tuning states corresponding to a plurality of illumination spectrums, at a first tuning state associated with a first illumination spectrum of the tunable light emitting diode source to generate a first set of interacted photons. A first data set representative of the first set on interacted photons is generated. A score image data set is generated based on the first data set. Whether the score image data set satisfies a tolerance level is determined. A set of test data is generated based on the score image data set when the score image data set satisfies the tolerance level.

A further aspect of the disclosure relates to a system comprising a processor and a non-transitory processor-readable storage medium in operable communication with the processor. The storage medium contains one or more programming instructions that, when executed, cause the processor to perform receiving at least a first data set and a second data set from an image sensor. The first and second data sets are collected by the image sensor based on illumination of a sample using a tunable light emitting diode source having a plurality of tuning states corresponding to a plurality of illumination spectrums. The first data set and the second data set are associated with a first tuning state associated with a first illumination spectrum and a second tuning state associated with a second illumination spectrum of the tunable light emitting diode source, respectively. A score image data set is generated based on an optical computation applied to the first and second data sets. Whether the score image data set satisfies a tolerance level is determined. A set of test data is generated based on the score image data set when the score image data set satisfies the tolerance level.

Yet another aspect of the disclosure relates to a system comprising a tunable light emitting diode source having a plurality of tuning states corresponding to a plurality of illumination spectrums, an image sensor, and a computing device comprising a processor and a non-transitory processor-readable storage medium in operable communication with the processor. The storage medium contains one or more programming instructions that, when executed, cause the processor to perform receiving at least a first data set and a second data set from the image sensor. The first and second data sets are collected by the image sensor based on illumination of a sample using the tunable light emitting diode source. The first data set and the second data set are associated with a first tuning state associated with a first illumination spectrum and a second tuning state associated with a second illumination spectrum of the tunable light emitting diode source, respectively. A score image data set is generated based on an optical computation applied to the first and second data sets. Whether the score image data set satisfies a tolerance level is determined. A set of test data is generated based on the score image data set when the score image data set satisfies the tolerance level.

In one embodiment, there is a method comprising: receiving at least a first data set from an image sensor, the first data set being collected by the image sensor based on illumination of a sample using a tunable light emitting diode source having a plurality of tuning states corresponding to a plurality of illumination spectrums, wherein the first data set is associated with a first tuning state associated with a first illumination spectrum; generating a score image data set based on the first data set; determining whether the score image data set satisfies a tolerance level; and generating a set of test data based on the score image data set when the score image data set satisfies the tolerance level.

In another embodiment, the method further comprises analyzing the set of test data to determine at least one characteristic of the sample.

In another embodiment, wherein the at least one characteristic comprises one or more of a presence of an analyte in the sample, an absence of the analyte in the sample, a classification of the analyte, a non-classification of the analyte, or a concentration of the analyte.

In another embodiment, wherein the first data set is representative of a first set of interacted photons based on the first illumination spectrum.

In another embodiment, wherein the first set of interacted photons and the second set of interacted photons comprise one or more of photons absorbed by the sample, photons reflected from the sample, photons scattered by the sample, or photons emitted by the sample.

In another embodiment, wherein the set of test data provides visual contrast between the sample and background materials.

In another embodiment, the method further comprises receiving a second data set from the image sensor, the second data set being collected by the image sensor based on illumination of the sample using the tunable light emitting diode source, wherein the second data set is associated with a second tuning state associated with a second illumination spectrum of the tunable light emitting diode source; and wherein generating the score image data set is based on the first data set and the second data set and includes applying an optical computation to the first data set and the second data set.

In another embodiment, the second data set is representative of a second set of interacted photons based on the second illumination spectrum.

In another embodiment, the second set of interacted photons comprise one or more of photons absorbed by the sample, photons reflected from the sample, photons scattered by the sample, photons emitted by the sample, or photons transmitted through the sample.

In another embodiment, the first data set comprises a first image (T1) and the second data set comprises a second image (T2), and the optical computation comprises one or more of T1+T2, T1−T2, T1*T2, T1/T2, or combinations thereof.

In another embodiment, the method further comprises: repeating the receiving, generating, and determining steps for at least one additional tuning state in response to the score image set of data not satisfying the tolerance level.

In another embodiment, the repeating is performed until the tolerance level is satisfied.

In another embodiment, the repeating is performed a pre-determined number of times or for a pre-determined amount of time.

In another embodiment, the tolerance level comprises at least one figure of merit.

In another embodiment, the at least one figure of merit comprises one or more of an area under the receiver operator characteristic (AUROC) curve, standard error of calibration (SEC), signal to noise ratio (SNR), a Fisher contrast ratio, standard error of prediction (SEP), or optical throughput (% T).

In another embodiment, the tunable light emitting diode source has a plurality of channels corresponding to a band of light and each combination of the plurality of channels corresponds to one of the plurality of tuning states.

In one embodiment, there is a method comprising: illuminating a sample, using a tunable light emitting diode source having a plurality of tuning states corresponding to a plurality of illumination spectrums, at a first tuning state associated with a first illumination spectrum of the tunable light emitting diode source to generate a first set of interacted photons; generating a first data set representative of the first set of interacted photons; generating a score image data set based on the first data set; determining whether the score image data set satisfies a tolerance level; and generating a set of test data based on the score image data set when the score image data set satisfies the tolerance level.

In another embodiment, the method further comprises analyzing the set of test data to determine at least one characteristic of the sample.

In another embodiment, the at least one characteristic comprises one or more of a presence of an analyte in the sample, an absence of the analyte in the sample, a classification of the analyte, a non-classification of the analyte, or a concentration of the analyte.

In another embodiment, the first data set is representative of the first set of interacted photons based on the first illumination spectrum.

In another embodiment, the first set of interacted photons comprise one or more of photons absorbed by the sample, photons reflected from the sample, photons scattered by the sample, or photons emitted by the sample.

In another embodiment, the set of test data provides visual contrast between the sample and background materials.

In another embodiment, the method further comprises: illuminating the sample using the tunable light emitting diode source at a second tuning state associated with a second illumination spectrum of the tunable light emitting diode source to generate a second set of interacted photons; generating a second data set representative of the second set of interacted photons; and wherein generating the score image data set is based on an optical computation applied to the first data set and the second data set.

In another embodiment, the second data set is representative of the second set of interacted photons based on the second illumination spectrum.

In another embodiment, the second set of interacted photons comprise one or more of photons absorbed by the sample, photons reflected from the sample, photons scattered by the sample, photons emitted by the sample, or photons transmitted through the sample.

In another embodiment, the first data set comprises a first image (T1) and the second data set comprises a second image (T2), and the optical computation comprises one or more of T1+T2, T1−T2, T1*T2, T1/T2, or combinations thereof.

In another embodiment, the method further comprises: repeating the receiving, generating, and determining steps for at least one additional tuning state in response to the score image set of data not satisfying the tolerance level.

In another embodiment, the repeating is performed until the tolerance level is satisfied.

In another embodiment, the repeating is performed a pre-determined number of times or for a pre-determined amount of time.

In another embodiment, the tolerance level comprises at least one figure of merit.

In another embodiment, the at least one figure of merit comprises one or more of an area under the receiver operator characteristic (AUROC) curve, standard error of calibration (SEC), signal to noise ratio (SNR), a Fisher contrast ratio, standard error of prediction (SEP), or optical throughput (% T).

In another embodiment, the tunable light emitting diode source has a plurality of channels corresponding to a band of light and each combination of the plurality of channels corresponds to one of the plurality of tuning states.

In one embodiment, there is a system comprising: a processor; and a non-transitory processor-readable storage medium in operable communication with the processor, wherein the storage medium contains one or more programming instructions that, when executed, cause the processor to perform the following: receiving at least a first data set and a second data set from an image sensor, the first and second data sets being collected by the image sensor based on illumination of a sample using a tunable light emitting diode source having a plurality of tuning states corresponding to a plurality of illumination spectrums, wherein the first data set and the second data set are associated with a first tuning state associated with a first illumination spectrum and a second tuning state associated with a second illumination spectrum of the tunable light emitting diode source, respectively; generating a score image data set based on an optical computation applied to the first and second data sets; determining whether the score image data set satisfies a tolerance level; and generating a set of test data based on the score image data set when the score image data set satisfies the tolerance level.

In another embodiment, the storage medium contains at least one additional programming instruction that, when executed, cause the processor to perform the following: analyzing the set of test data to determine at least one characteristic of the sample.

In another embodiment, the at least one characteristic comprises one or more of a presence of an analyte in the sample, an absence of the analyte in the sample, a classification of the analyte, a non-classification of the analyte, or a concentration of the analyte.

In another embodiment, the first data set is representative of a first set of interacted photons based on the first illumination spectrum and the second data set is representative of a second set of interacted photons based on the second illumination spectrum.

In another embodiment, the first set of interacted photons and the second set of interacted photons comprise one or more of photons absorbed by the sample, photons reflected from the sample, photons scattered by the sample, photons emitted by the sample, or photons transmitted through the samples.

In another embodiment, the set of test data provides visual contrast between the sample and background materials.

In another embodiment, the storage medium contains at least one additional programming instruction that, when executed, cause the processor to perform the following: repeating the receiving, generating, and determining steps for at least one additional tuning state in response to the score image set of data not satisfying the tolerance level.

In another embodiment, the repeating is performed until the tolerance level is satisfied.

In another embodiment, the repeating is performed a pre-determined number of times or for a pre-determined amount of time.

In another embodiment, the first data set comprises a first image (T1) and the second data set comprises a second image (T2), and the optical computation comprises one or more of T1+T2, T1−T2, T1*T2, T1/T2, or combinations thereof.

In another embodiment, the tolerance level comprises at least one figure of merit.

In another embodiment, the at least one figure of merit comprises one or more of an area under the receiver operator characteristic (AUROC) curve, standard error of calibration (SEC), signal to noise ratio (SNR), a Fisher contrast ratio, standard error of prediction (SEP), or optical throughput (% T).

In another embodiment, the tunable light emitting diode has a plurality of channels corresponding to a band of light and each combination of the plurality of channels corresponds to one of the plurality of tuning states.

In one embodiment, there is a system comprising: a tunable light emitting diode source having a plurality of tuning states corresponding to a plurality of illumination spectrums; an image sensor; and a computing device comprising: a processor; and a non-transitory processor-readable storage medium in operable communication with the processor, wherein the storage medium contains one or more programming instructions that, when executed, cause the processor to perform the following: receiving at least a first data set and a second data set from the image sensor, the first and second data sets being collected by the image sensor based on illumination of a sample using, wherein the first data set and the second data set are associated with a first tuning state associated with a first illumination spectrum and a second tuning state associated with a second illumination spectrum of the tunable light emitting diode source, respectively; generating a score image data set based on an optical computation applied to the first and second data sets; determining whether the score image data set satisfies a tolerance level; and generating a set of test data based on the score image data set when the score image data set satisfies the tolerance level.

In another embodiment, the storage medium contains at least one additional programming instruction that, when executed, cause the processor to perform the following: analyzing the set of test data to determine at least one characteristic of the sample.

In another embodiment, the at least one characteristic comprises one or more of a presence of an analyte in the sample, an absence of the analyte in the sample, a classification of the analyte, a non-classification of the analyte, or a concentration of the analyte.

In another embodiment, the first data set is representative of a first set of interacted photons based on the first illumination spectrum and the second data set is representative of a second set of interacted photons based on the second illumination spectrum.

In another embodiment, the first set of interacted photons and the second set of interacted photons comprise one or more of photons absorbed by the sample, photons reflected from the sample, photons scattered by the sample, photons emitted by the sample, or photons transmitted through the sample.

In another embodiment, the set of test data provides visual contrast between the sample and background materials.

In another embodiment, the storage medium contains at least one additional programming instruction that, when executed, cause the processor to perform the following: repeating the receiving, generating, and determining steps for at least one additional tuning state in response to the score image set of data not satisfying the tolerance level.

In another embodiment, the repeating is performed until the tolerance level is satisfied.

In another embodiment, the repeating is performed a pre-determined number of times or for a pre-determined amount of time.

In another embodiment, the first data set comprises a first image (T1) and the second data set comprises a second image (T2), and the optical computation comprises one or more of T1+T2, T1−T2, T1*T2, T1/T2, or combinations thereof.

In another embodiment, the tolerance level comprises at least one figure of merit.

In another embodiment, the at least one figure of merit comprises one or more of an area under the receiver operator characteristic (AUROC) curve, standard error of calibration (SEC), signal to noise ratio (SNR), a Fisher contrast ratio, standard error of prediction (SEP), or optical throughput (% T).

In another embodiment, the tunable light emitting diode has a plurality of channels corresponding to a band of light and each combination of the plurality of channels corresponds to one of the plurality of tuning states.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

This disclosure is not limited to the particular systems, methods, and computer program products described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The embodiments described below are not intended to be exhaustive or to limit the teachings to the precise forms disclosed in the following detailed description. Rather, the embodiments are chosen and described so that others skilled in the art may appreciate and understand the principles and practices of the present teachings.

The disclosure contemplates systems, methods, and computer program products that are designed to illuminate a sample with illuminating photons, collect interacted photons from the sample by way of a camera chip, generate two or more sample images from the interacted photons that have been collected and imaged by the camera chip, and fuse the two or more sample images so as to generate a target score image. The target score image is generated by applying mathematical operations to the two or more sample images in order to fuse the two or more sample images. The target score image has greater contrast and information than would be possible with any one of the two or more sample images that are formed from the interacted photons. Further details of the disclosure are provided below.

Figure 1:
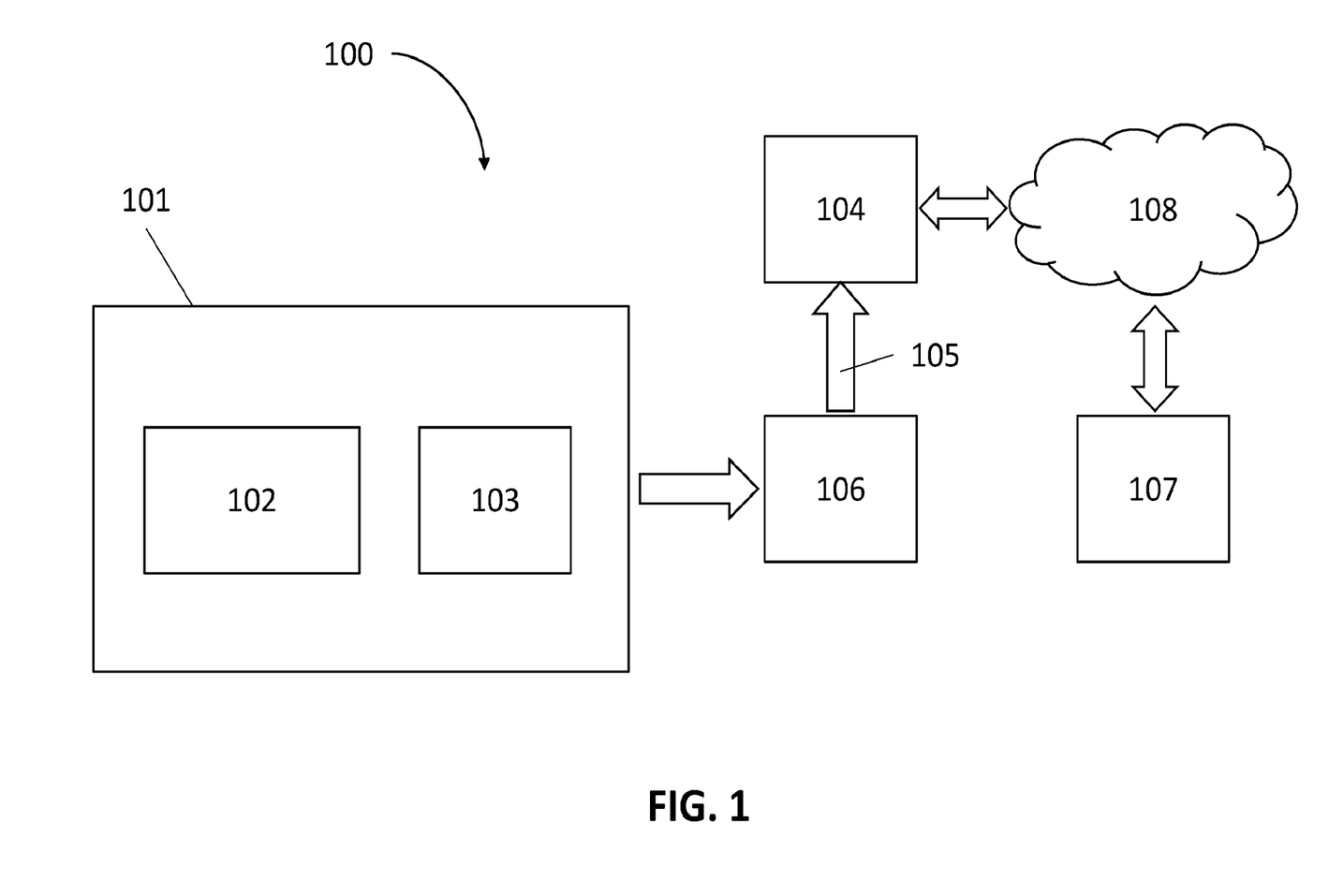
FIG. 1 depicts a system for assessing analytes using a tunable light emitting diode source in accordance with an embodiment.

Referring to FIG. 1, a system 100 for assessing analytes (not shown) using a tunable light emitting diode (LED) source 101 is illustrated. In this example, the system 100 includes a tunable LED source 101, an image sensor 104, and an analyte analysis computing device 107, although the system 100 can include other types and/or numbers of elements in other combinations, including additional optics. The system allows for in situ optimization of discrimination of the target and background materials using real-time feedback produced by the image sensor from a live scene.

In this example, the tunable LED source 101 is used as the illumination source to illuminate a sample 106, although in other examples other tunable light sources may be employed for illumination. The tunable LED source 101 has a plurality of tuning states, as described below. Each of the plurality of tuning states correspond to a plurality of illumination spectrums for the tunable LED source.

One example of a tunable LED source 101 includes 32 LED channels (which are shown as 103 in FIG. 1), each corresponding to a band of light, although other sources with other numbers of channels can be utilized. Although the number of LED channels 103 is described here as being 32 channels, the number of channels is not limited. In some embodiments, the number of LED channels is 2 channels, 10 channels, 20 channels, or 40 channels, or any number of channels between 2 and 40 channels, or any range that includes one or more of the above. In some embodiments, there are 2 or more LED channels, or 2 to 40 LED channels. Each of the channels can have a setting that ranges from 0 (i.e., no light output) to 1 (i.e., maximum light output). The channels 103 are tunable with a finite amount of precision between the setting range from 0 to 1. Each combination of the settings for the 32 channels comprises one of the plurality of tuning states for the tunable LED source 101 that corresponds to a unique illumination spectrum. In one example, the setting for the 32 channels of the tunable LED source can be provided by the analyte analysis computing device 107, although in other examples, the settings may be set by a control unit 102 associated with the tunable LED light source 101 based on feedback from the analyte analysis computing device 107. In further examples, the control unit 102 and the analyte analysis computing device 107 may be a single device. In one example, one or more tuning states for the tunable LED source can be determined, using the exemplary methods described below, to determine an optimal discrimination between a target analyte and the background materials in an image obtained.

The image sensor 104 is positioned to collect interacted photons 105 from the sample 106 based on the illumination from the tunable LED source 101. In one example, the interacted photons 105 are collected in real-time as the channels 103 of the tunable LED source 101 are adjusted to provide different tuning states for the tunable LED source 101. By way of example, the image sensor 104 can include one or more imaging devices, such as a CCD detector, an InGaAs detector, a CMOS detector, an InSb detector, a MCT detector, or combinations thereof, although other types and/or numbers of image sensors may be employed. One or more optics, such as mirrors and/or lenses, may be utilized to direct the interacted photons onto the image sensor. The interacted photons 105 comprise one or more of photons absorbed by the sample, photons reflected from the sample, photons scattered by the sample, or photons emitted by the sample.

The image sensor 104 is configured to generate one or more data sets based on illumination of the sample. In one example, the image sensor 104 generates a first data set and a second data set that are associated with a first tuning state of the tunable LED source and a second tuning state of the tunable LED source, respectively, although the image sensor may generate other numbers of data sets associated with various tuning states. In this example, each of the data sets are associated with an illumination spectrum based on the setting of the channels of the tunable LED source as described above.

Figure 2:
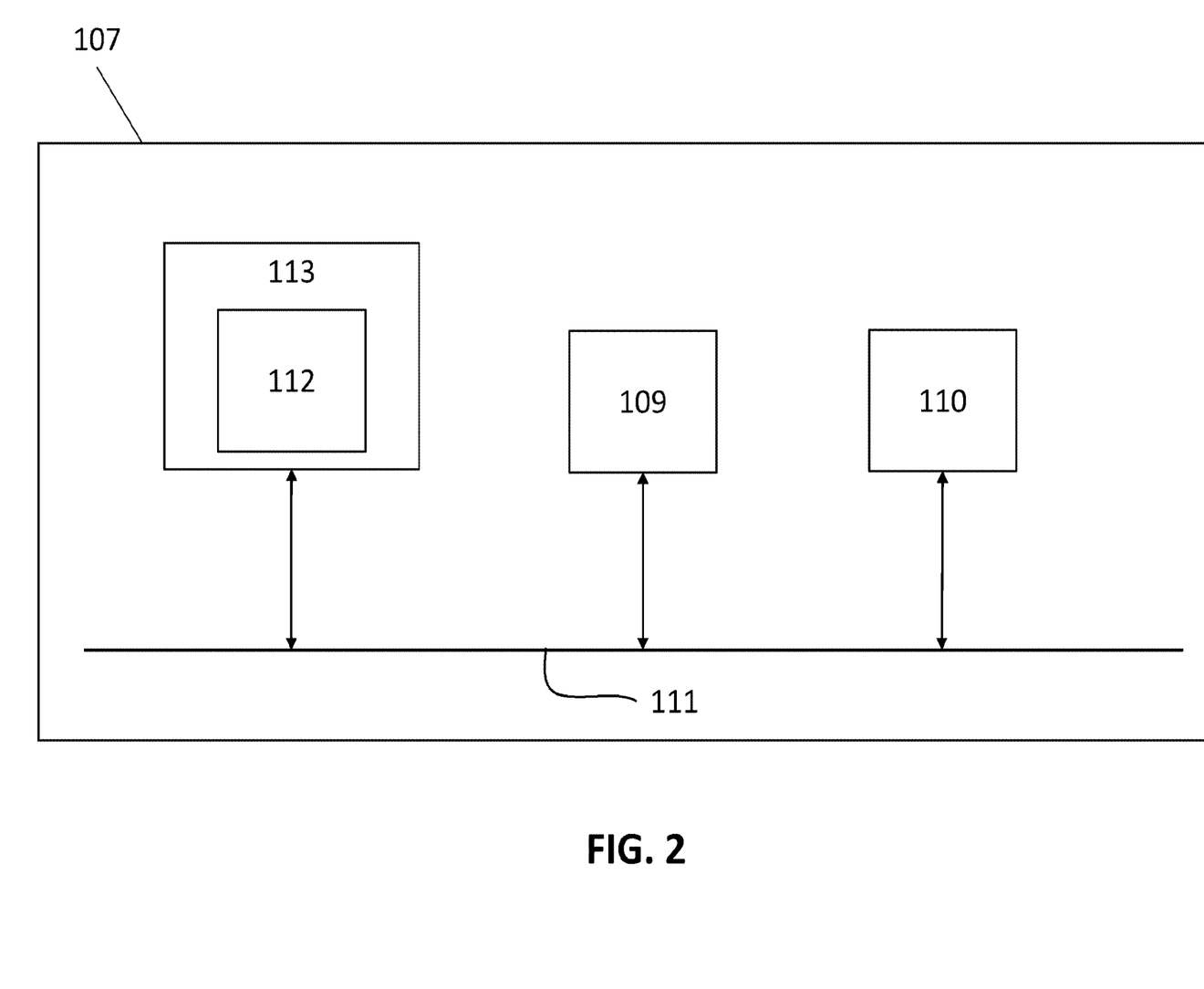
FIG. 2 illustrates an exemplary analyte analysis computing device in accordance with an embodiment.

Referring now to FIG. 2, the analyte analysis computing device 107 is coupled to the tunable LED source and the image sensor (both not shown). The analyte analysis computing device 107 of the system may perform any number of functions, including determining an optimal tuning state for the tunable LED light source to provide optimal distinction between the analyte of interest and background materials. The analyte analysis computing device 107 provides real-time feedback of a live scene based on the one or more data sets received from the image sensor. The analyte analysis computing device in this example includes processor(s) 109, a memory 113, and a communication interface 110, which are coupled together by a bus 111, although the analyte analysis computing device 107 can include other types or numbers of elements in other configurations in other examples. By way of example, the analyte analysis computing device can include other electronics for image analysis such as analog to digital converters, etc.

The processor(s) of the analyte analysis computing device may execute programmed instructions stored in the memory of the analyte analysis computing device for any number of the functions described and illustrated herein. The processor(s) of the analyte analysis computing device may include one or more central processing units (CPUs) or general purpose processors with one or more processing cores, for example, although other types of processor(s) can also be used.

The memory of the analyte analysis computing device stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives (SSDs), flash memory, and/or any other computer readable medium which is read from and written to by a magnetic, optical, or other reading and writing system that is coupled to the processor(s), can be used for the memory.

Figure 3:
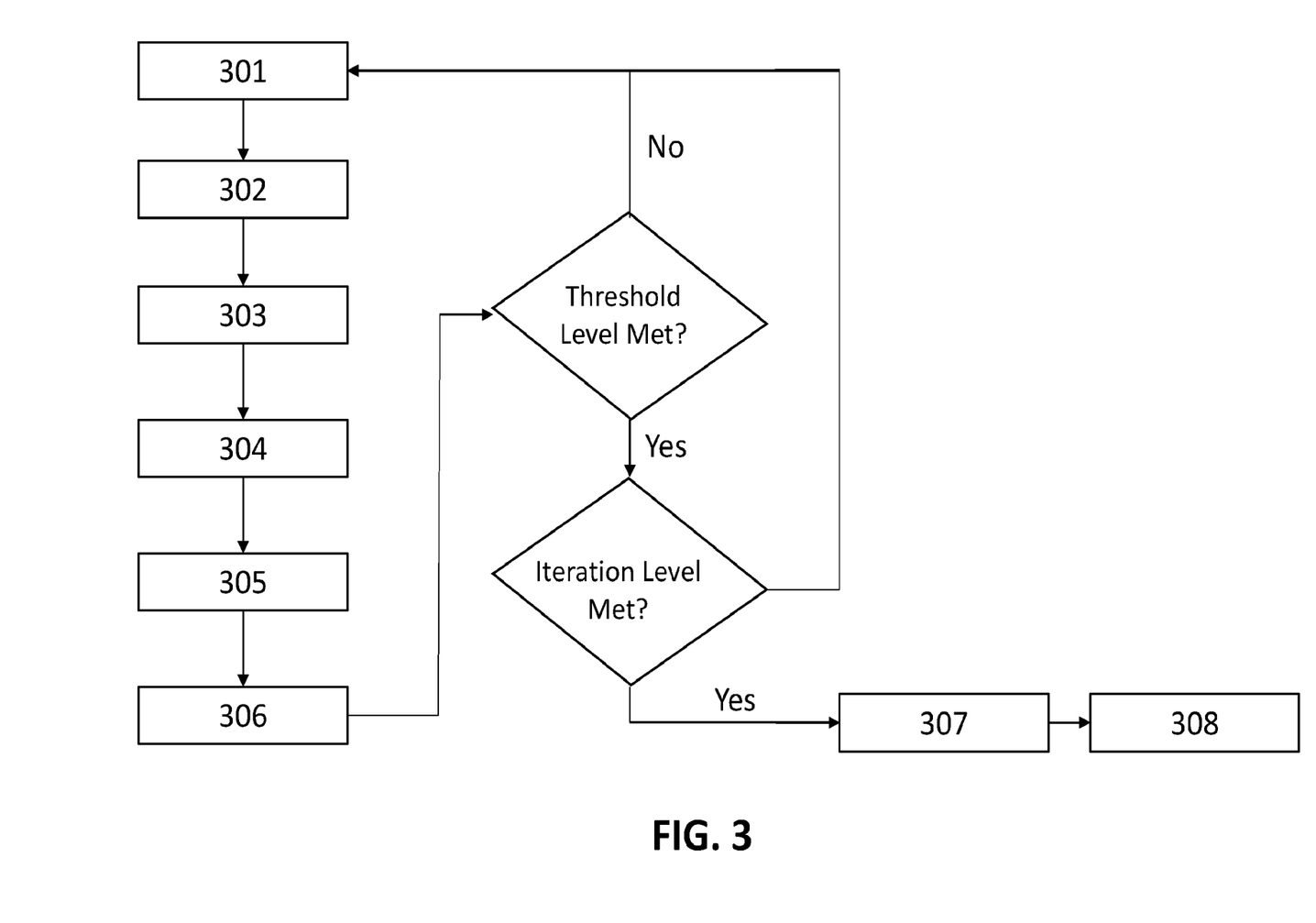
FIG. 3 illustrates a flowchart of an exemplary method of an optimized process for assessing an analyte using a tunable light emitting diode source.

Accordingly, the memory of the analyte analysis computing device can store one or more modules that can include computer executable instructions that, when executed by the analyte analysis computing device, cause the analyte analysis computing device to perform actions, such as to transmit, receive, or otherwise process communications and/or the contents thereof, such as the one or more data sets received from the image sensor, for example, and to perform other actions described and illustrated below with reference to FIG. 3 below. The modules can be implemented as components of other modules. Further, the modules can be implemented as applications, operating system extensions, plugins, or the like.

In this particular example, the memory 113 of the analyte analysis computing device 107 includes an image processing module 112. The image processing module 112 in this example is configured to receive the one or more data sets from the image sensor and generate and optimize composite images therefrom. The image processing module can apply computational techniques, as described below, for determining an optimal contrast between the analyte of interest and the background materials based on the illumination spectrums employed. The operation of the image processing module in some examples is described and illustrated in more detail later with reference to FIG. 3.

Referring back to FIG. 2, the communication interface 110 of the analyte analysis computing device 107 operatively couples and communicates between the analyte analysis computing device 107 and image sensor and the tunable LED light source, although the analyte analysis computing device may communicate with other devices. In these examples, the analyte analysis computing device, the image sensor, and the tunable LED light source are coupled together by a direct, wired connection or communication network(s) 108, for example, although other types of connections or configurations can also be used.

By way of example only, the connection(s) and/or communication network(s) can include local area network(s) (LAN(s)) that use TCP/IP over Ethernet and industry-standard protocols, although other types or numbers of protocols or communication networks can be used. The communication network(s) in this example can employ any suitable interface mechanisms and network communication technologies including, for example, Ethernet-based Packet Data Networks (PDNs), and the like.

While the analyte analysis computing device is illustrated in this example as including a single device, the analyte analysis computing device in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the analyte analysis computing device. Additionally, one or more of the devices that together comprise the analyte analysis computing device (in other examples can be standalone devices or integrated with one or more other devices or apparatuses. In one example, on or more aspects of the analyte analysis computing device can be performed by virtual devices.

One or more of the components depicted in the system, such as the analyte analysis computing device may be configured to operate as virtual instances on the same physical machine. In other words, the analyte analysis computing device may operate on the same physical device rather than as separate devices communicating through connection(s) and/or communication network(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples.

The examples may also be embodied as one or more non-transitory computer readable media having instructions stored thereon, such as in the memory of the analyte analysis computing device, for one or more aspects of the present technology, as described and illustrated by way of the examples herein. The instructions in some examples include executable code that, when executed by one or more processors, such as the processor(s) of the analyte analysis computing device, cause the processors to carry out steps necessary to implement the methods of the examples of this technology that are described and illustrated herein.

Referring more specifically to FIG. 3, a flow of an exemplary method for assessing analytes using the system of FIG. 1, including the tunable LED source, is illustrated. The exemplary method allows for the determination of one or more optimal tuning states for the tunable LED light source for providing discrimination between the target analyte in the sample, and background materials.

First, the sample is illuminated using the tunable LED source. The sample is illuminated at a first tuning state associated with a first illumination spectrum in block 301. In this example, the first tuning state is defined by the combination of the settings for the 2 or more channels. The illumination of the sample at the first tuning state generates a first set of interacted photons that are collected by the image sensor. In one example, the first tuning state is chosen based on a first illumination spectrum associated with the analyte of interest. The first tuning state may be determined using a number of seeding methods. In one example, the first tuning state may be selected using random seed points. The seed points may also be selected by coarsely sampling the search space in real-time (i.e. by collecting data sets or images at several tuning states), computing the desired figure of merit for each, and selecting the top performing tuning states as seeds points for the optimization method. In another example, the seed point(s) may be chosen from the result(s) of a spectral library-based training method. For example, a discriminant vector could be created and the LED settings determined that best mimic the spectral shapes of the positive and negative lobes of that vector. In this example, the discriminant vector can be determined from a variety of methods including partial least squares discriminant analysis (PLSDA). In another example, a regression vector could be created using a partial least squares regression and the seed point(s) may be selected from the results. In yet another example, seed points are selected by spectrally matching the LED tuning state spectral profile(s) to the known spectral profiles of the target and background materials, for example, using a look-up table.

Next, the sample is illuminated using the tunable LED light source at a second tuning state associated with a second illumination spectrum as shown in block 302. In order to provide the second tuning state, the setting of the tunable LED light source are modified by adjusting the 2 or more channels of the tunable LED light source to generate the second tuning state. The illumination of the sample at the second tuning state generates a second set of interacted photons that are collected by the image sensor as shown in block 303. In one example, the sample is illuminated in both illuminations described above using wide-field illumination.

The image sensor generates a first data set representative of the first set on interacted photons and a second data set representative of the second set of interacted photons as shown in block 304. The first data set and the second data set provide data based on two separate tuning states of the tunable LED light source, which allows for optimization of variables. The number of variables corresponds to two times the number of LED channels with respect to the generated illumination spectra. The number of variables refers to turning the LED channels to two states which are "on" with maximum light output and "off" without light output. The optimization can also include tuning the individual LED channels to variable intensity levels increasing the number of optimization variables to include a finite amount of precision between the LED channel minimum and maximum light output. The data sets may comprise at least one of the following: an IR data set, a VIS data set, a UV data set, a VIS-NIR data set, or a fluorescence data set. In one example, the data sets may comprise at least one spectral image. This spectral image may comprise an image wherein each pixel of the image is the intensity measurement of the analyte of interest at that location. The first data set and the second data sets are provided to the analyte analysis computing device for further processing in accordance with the exemplary method, although the exemplary method may be performed using additional data sets based on additional tuning states of the tunable LED light source.

Next, the analyte analysis computing device receives at least the first and second data sets from the image sensor in block 305. The data sets are received by the analyte analysis computing device in real-time from the image sensor as the setting of the tunable LED light source is adjusted. Accordingly, the analyte analysis computing device is able to provide real-time feedback regarding data obtained by the image sensor of a live scene.

The analyte analysis computing device generates a score image data set based on an optical computation applied to the first and second data sets in block 306, although in other examples the analyte analysis computing device can generate the score image data set based on a single data set. In one example, the first and second data sets comprise images T1 and T2, respectively. The analyte analysis computing device can generate the score image data set using any optical computations for T1 and T2, including by way of example, one or more of T1+T2, T1−T2, T1*T2, T1/T2, or combinations thereof. Other optical computations known in the art may also be applied and the present disclosure should not be construed as to be limited to those specified herein.

Next, the analyte analysis computing device determines whether the score image data set satisfies a tolerance level. In one example, the tolerance level comprises applying at least one figure of merit (FOM) to the score image data set, although other tolerance levels may be employed. The FOM is a numerical value that may be used to guide the optimization performed using the exemplary method described herein. The at least one FOM can comprise one or more of an area under the receiver operator characteristic (AUROC) curve, standard error of calibration (SEC), signal to noise ratio (SNR), a Fisher contrast ratio, standard error of prediction (SEP), optical throughput (% T), or combinations thereof, by way of example. In one example, determining whether the score image data set satisfies a tolerance level is supervised, i.e., a user selects target regions and background regions in the generated images. The user selected regions in the images must then satisfy the tolerance level of the FOM.

If the analyte analysis computing device determines in the preceding step that the tolerance level is not met, the NO branch is taken and the above steps, including the analysis computing device receiving data based on two illumination states of the tunable LED source, generating the score image data set, and determining whether the score image data set satisfies the tolerance level are repeated for illumination of the sample at least one additional tuning state. The at least one additional tuning state can be chosen using any number of optimization algorithms including, by way of example only, the Nelder-Mead method. In other examples, the algorithms disclosed in Levenberg, K, "A Method for the Solution of Certain Non-Linear Problems in Least Squares," *Quarterly of Applied Mathematics*, 2(2), 164-168 (1944); Marquardt, D. W, "An Algorithm for Least-Squares Estimation of Nonlinear Parameters," *Journal of the Society for Industrial and Applied Mathematics*, 11(2), 431-441 (1963); Schnabel, R. B., "Numerical Methods for Unconstrained Optimization and Nonlinear Equations," Vol. 16, Siam (1963), the disclosures of which are incorporated herein by reference in their entirety, may be employed. In another example, a population algorithm, such as particle swarm may be employed. In one example, the sample can be illuminated at two different tunings states. This process may be repeated until the generated score image data set satisfies the threshold level. In another example, the exemplary optimization method is performed a pre-determined number of times or for a pre-determined amount of time.

If the analysis computing device determines that the tolerance level is met (or if the process has been completed for a pre-determined number of iterations of for a pre-set period of time) the YES branch is taken. Next, the analyte analysis computing device generates a set of test data based on the score image data set as shown in block 307.

The generated set of test data can then be analyzed in block 308 by the analyte analysis computing device to determine at least one characteristic of the sample. The at least one characteristic can comprises one or more of a presence of an analyte in the sample, an absence of the analyte in the sample, a classification of the analyte, a non-classification of the analyte, or a concentration of the analyte, by way of example. In one example, the set of test data provides visual contrast between the sample and background materials, which is optimized using the exemplary process described herein.

The above method advantageously provides for in situ optimization of a tunable LED source using live feedback from an imaging device. The optimization method may be employed to generate test data that provides visual contrast between the sample and background materials in situ. The exemplary method advantageously provides the optimization based on the live feedback from the imaging device.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method comprising:
   receiving at least a first data set and a second data set from an image sensor, the first and second data sets being collected by the image sensor based on illumination of a sample using a tunable light emitting diode source having a plurality of tuning states corresponding to a plurality of illumination spectrums, wherein the first data set and the second data set are associated with a first tuning state associated with a first illumination spectrum and a second tuning state associated with a second illumination spectrum of the tunable light emitting diode source, respectively;
   generating a score image data set based on an optical computation applied to the first and second data sets;
   determining whether the score image data set satisfies a tolerance level; and
   generating a set of test data based on the score image data set when the score image data set satisfies the tolerance level.

2. The method of claim 1, further comprising analyzing the set of test data to determine at least one characteristic of the sample.

3. The method of claim 2, wherein the at least one characteristic comprises one or more of a presence of an analyte in the sample, an absence of the analyte in the sample, a classification of the analyte, a non-classification of the analyte, or a concentration of the analyte.

4. The method of claim 1, wherein the first data set is representative of a first set of interacted photons based on the first illumination spectrum and the second data set is representative of a second set of interacted photons based on the second illumination spectrum.

5. The method of claim 4, wherein the first set of interacted photons and the second set of interacted photons comprise one or more of photons absorbed by the sample, photons reflected from the sample, photons scattered by the sample, or photons emitted by the sample.

6. The method of claim 1, wherein the set of test data provides visual contrast between the sample and background materials.

7. The method of claim 1, further comprising:
   repeating the receiving, generating, and determining steps for at least one additional tuning state in response to the score image set of data not satisfying the tolerance level.

8. The method of claim 7, wherein the repeating is performed until the tolerance level is satisfied.

9. The method of claim 7, wherein the repeating is performed a pre-determined number of times or for a pre-determined amount of time.

10. The method of claim 1, wherein the first data set comprises a first image (T1) and the second data set comprises a second image (T2), and the optical computation comprises one or more of T1+T2, T1−T2, T1*T2, T1/T2, or combinations thereof.

11. The method of claim 1, wherein the tolerance level comprises at least one figure of merit.

12. The method of claim 1, wherein at least one figure of merit comprises one or more of an area under the receiver operator characteristic (AUROC) curve, standard error of calibration (SEC), signal to noise ratio (SNR), a Fisher contrast ratio, standard error of prediction (SEP), or optical throughput (% T).

13. The method of claim 1, wherein the tunable light emitting diode source has a plurality of channels corresponding to a band of light and each combination of the plurality of channels corresponds to one of the plurality of tuning states.

* * * * *